Patented Mar. 1, 1938

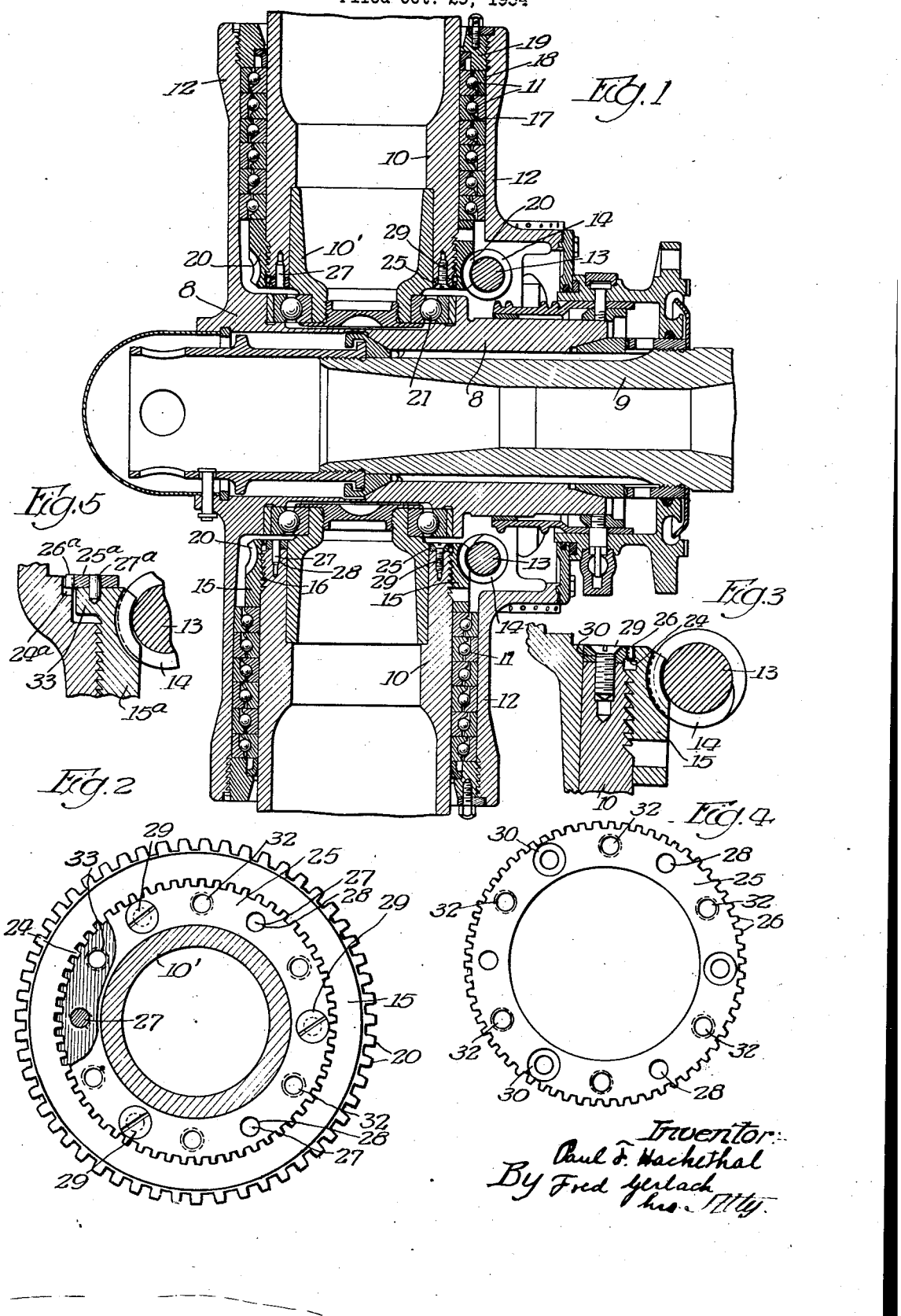

2,109,696

UNITED STATES PATENT OFFICE 2,109,696

PROPELLER

Paul F. Hackethal, Williamsport, Pa., assignor, by mesne assignments, to Aviation Manufacturing Corporation, Chicago, Ill., a corporation of Delaware Application October 29, 1934, Serial No. 750,414

7 Claims. (Cl. 170—163)

The invention relates to variable pitch propellers.

In aircraft propellers, in which the blades are mounted to rotate in the hub for pitch variation, the blades are subjected to centrifugal and torsional forces and the torsion is transmitted to the adjusting mechanism for the blades. In operation, the centrifugal components in the plane of the blade sections, perpendicular to the blade center, develop a strong moment tending to cause the blades to reduce their pitch and, at the same time, air forces apply torsion to the blade, the magnitude of which depends upon the specific blade design and the flight conditions.

Heretofore it has been the practice to screw gear rings with teeth for engagement by worms to the shanks of the propeller blades. These rings or nuts are rotatable by suitable power operated gearing to vary the pitch of the blade, as exemplified in patent to Smith No. 1,886,602.

In order to take the blade torsion, the gear ring or nut must be fixed in angular relation to the blade, so it will not unscrew. In consequence, it is necessary to provide efficient means for locking the gear nut and the blade shank together. It is also important that the several blades of the propeller be synchronized or set accurately at the same pitch to develop equal air forces and to properly locate the gear nut on the blade for both angular and axial dimensions, with respect to the mechanism for shifting the blades to vary their pitch.

Heretofore it has been the practice to secure the gear-nut in its adjusted position by radial screws or dowel pins, as illustrated in said Patent No. 1,886,602. In the event that it became necessary to replace a blade in the field, where tools and fixtures are not available, it was difficult to locate and lock the gear-nut on the propeller blades so they would be synchronized and develop equal forces and so the gear would be properly located angularly and axially, with respect to the worm for rotating the blade. In the case of a loose fit on the thread between the nut and the shank of the blade, the dowels were subjected to shearing stresses of great magnitude, although designed to take only torsional stresses.

One object of the invention is to provide an improved device for locking and connecting the gear-ring or nut to the shank so that a fine adjustment of the pitch angle of the several blades, with accurate synchronization and equal development of air forces, can be readily attained.

Another object of the invention is to provide an improved locking means which avoids the necessity of locating the gear-nut simultaneously on the blade for both angular and axial dimensions, which has been necessary when radial dowel pins or screws are used.

These objects are attained primarily by providing a locking element or ring intermediate the shank of the blade and the gear-nut which has a series of teeth to interfit with a series of teeth on the gear in a multiplicity of relative positions and can be locked to the blade, or vice versa, in a multiplicity of positions.

Another object is to provide a locking element or ring which can be set into locking position by axial movement after the blade and gear-nut have been assembled and rotated into desired angular and axial positions.

Other objects of the invention will appear from the detail description.

The invention consists in the several novel features which are hereinafter set forth and are more particularly defined by claims at the conclusion hereof.

In the drawing:

Fig. 1 is an axial section through an aircraft propeller embodying the invention.

Fig. 2 is an end view illustrating the shank of the blade and the locking means between the gear-nut and the blade the sleeve in the end of the blade being shown in section.

Fig. 3 is an enlarged section through the gear-nut, shank, and locking-ring.

Fig. 4 is a detail of the locking-ring.

Fig. 5 is a section through a modified form of the invention.

The invention is exemplified with a controllable pitch propeller which comprises a hub 8 secured on the shaft 9 of, or driven by, an engine; a plurality of propeller blades, each having a cylindrical shank 10, which is suitably journaled in a series of ball-bearings 11 which are confined in tubular radial extensions 12 which are integral with the hub 10 and in a ball-bearing 21 around the inner end of a sleeve 10' fixed in the shank; shafts 13, journaled in the hub 10, and each provided with a worm 14, and a gear-ring or nut 15 on each blade shank, having teeth 20 meshing with one of the worms 14; and an internal buttress screw thread engaging a corresponding thread on the inner end of the shank. The outer face of each nut engages the inner race 17 for the bearings 11 to transmit centrifugal thrust through the series of inner races and the bearing-balls 11 to the outer set of ball-races 18. An adjustable abutment ring 19 is threaded into the outer end of each hub extension 12, to engage the race 18 at the outer end of the series and resist the centrifugal force developed in operation of the propeller. The gear 15 and the worm 14 are adapted to rotate the blades on their own axes for pitch adjustment, and are operable, and may be controlled for that purpose, by any suitable mechanism such, for example, as that set forth in Patent No. 1,886,602. The torsional forces to which the blades are subjected are transmitted through the gear 15 to the operating and control mechanism and, in consequence, it is important to provide for accurate angular adjustment between the gear 15 and the blades for retaining them at equal pitch or for synchronization. It is also important to locate the gear 15 axially for correct engagement with its worm or so that the pitch-center of the worm-gear teeth coincides with the center of the worm 14.

The improved means for adjustably locking each gear-nut 15 to the shank of a blade according to these requirements comprises an annular series of internal teeth 24 formed on the inner end of the gear-nut 15, which extend radially inward from the inner end of the shank 10; a locking member or ring 25, which fits around the blade-shank and is provided on its outer periphery with an annular series of teeth 26 shaped to interfit with the teeth 24 on the nut; a series of equi-distantly spaced dowel-pins 27 which are secured in, and project from, the inner end of the blade-shank and are adapted to interchangeably enter a series of holes 28 in the ring 25; and a series of screws 29 which are adapted to pass through countersunk holes 30 in the ring and are threaded into the blade-shank, to secure the ring against the inner end of the shank and on the dowel-pins 27. The flanks of the interfitting teeth 24, 26 extend axially of the blade, so they will interfit independently of the axial position of the nut on the shank. The dowel-pins 27, screws 29, and the holes in the ring all extend axially of the blade so the locking ring can be assembled with the shank by axial movement.

In assembling the parts, the bearings 11, races 17, 18 and gear-nut 15 are placed on the shank of the blade. The gear-nut is screwed into place until it has the proper axial location on the shank of the blade so the pitch-center of gear-teeth 20 on the nut 15 will be coincident with the center of worm 14. The locking ring 25 is then slipped axially onto the shank with the dowel-pins 27 entering the holes 28 in the ring. The screws 29 are then secured in the shank to secure the locking ring on the shank and lock the nut against rotation on the shank. If desired, a series of screw-threaded holes 32 may be formed in the locking ring for screws adapted to enter sockets 33 in the shank for removing the locking ring from the shank.

In the exemplification of the invention illustrated, there is a series of three dowel-pins and holes for three screws 29. These are equi-distantly spaced, so that the locking ring may be rotated to or placed in three different positions on the shank. The annular series of intermeshing teeth on the gear-nut and locking ring make it possible to lock the gear-nut in a great multiplicity of positions, relatively to the shank. The possibility of securing the locking ring in three different positions on the shank increases the multiplicity of points at which the ring-nut may be secured, because the intermeshing teeth can be of such number or co-related with respect to the different positions of the gear on the blade, so that the locking fit will intermesh and interlock at one or another of the relative positions of the gear 15 on the shank. In other words, the dowel-pins will position the ring so its teeth will be in slightly different positions so that the gear-nut will, at most, require rotation equal to a small fraction of the distance between adjacent teeth, to bring the teeth into alignment for interlocking. By reason of the large number of intermeshing teeth between the ring and the nut, the locking ring can secure the gear-nut in a large multiplicity of positions on the shank. This can usually be done without substantial angular or rotative adjustment of the gear nut on the shank. The number of interfitting teeth selected for the locking ring 25 and gear-nut is such that the locking ring, which may be rotatively placed in three positions or a number of positions corresponding to the number of dowel-pins and holes for the screws 29, will bring the teeth on the gear-nut and locking ring into slightly different relation or into different positions so the teeth on the ring will pass into interfitting relation without requiring rotation of the nut on the shank. This makes if possible to obtain a very accurate and fine angular adjustment of the nut, with respect to the blade. The maximum angular variation which may be necessary in locking the nut to the ring will have a negligible effect on the axial position of the nut. This also makes it possible to accurately synchronize the several blades of the propeller by positioning them at corresponding pitch, without altering the desired axial relation of the gear-nut on the shank.

The length of the gear-teeth between the ring 25 and the gear-nut is such that they will be sufficiently strong, even though the axial location of the nut, in screwing it onto the shank, is materially varied or the teeth are not exactly matched in an axial direction. Since the flanks of the teeth are axial, the angular fixation by tooth load is independent of axial nut position. This feature, together with the delicate adjustment obtainable, makes it possible to manufacture the several parts without requiring any fixed relation between axial and angular dimensions. It also makes it possible to easily and readily interchange parts of the propeller. This is particularly advantageous in making repairs and procuring the correct adjustment or setting in the field.

Fig. 5 illustrates a modified form of the invention in which the locking ring 25a is provided with gear teeth 26a which are adapted to interfit with an annular series of peripheral gear teeth 24a cut on the shank of the hub. The locking ring is secured to an inwardly-extending flange 33 on the gear nut 15a by means of a series of dowel-pins 27a and screws in the same manner as the locking ring is secured to the blade-shank in the construction previously described. In this form of the invention the ring is slipped onto the dowel pins which are fixed in the ring nut, to bring its teeth so as to interfit with the teeth cut on the blade-shank and the locking of the nut is effected by intermeshing teeth on the shank and ring.

The invention exemplifies efficient means for securing the gear-nut on the shank of a propeller blade, which permits both angular and axial dimensions to be fixed for accurate pitch setting and axially so as to be properly positioned relatively to the gear for rotating the blade on its axis. Also a construction which makes it readily possible to assemble in the field or in making a replacement of parts. Also one which permits the parts to be readily assembled, and so as to attain the very fine angular and radial adjustment desired in airplane propellers.

The invention is not to be understood as restricted to the details set forth since these may be modified within the scope of the appended claims without departing from the spirit and scope of the invention.

What I claim as new and desire to secure by Letters Patent is:

1. In a variable pitch propeller, the combination of a hub, a propeller blade having a shank mounted to rotate on its own axis and in the hub, a ring screw-threaded to the inner end portion of the shank provided on its outer periphery with an annular series of gear teeth, a gear carried by, and rotatable in, the hub and meshing with the ring for rotatably adjusting the blade in the hub, the shank having a substantially flat transverse face adjacent its inner end, means for locking the gear-ring and blade together for conjoint rotation and in different positions resulting from relative movement of the gear-ring and the shank, comprising an axially extending annular series of teeth on the inner periphery of the gear-ring, a locking ring fitting against the flat transverse face on the shank and provided with an annular series of axially extending teeth on its outer periphery interfitting with the teeth on the gear-ring and means for fixedly securing the locking ring against the transverse face on the shank.

2. In a variable pitch propeller, the combination of a hub, a propeller blade having a shank mounted to rotate on its own axis and in the hub, a ring screw-threaded to the inner end portion of the shank provided on its outer periphery with an annular series of gear teeth, a gear carried by, and rotatable in, the hub and meshing with the ring for rotatably adjusting the blade in the hub, the shank having a substantially flat transverse face adjacent its inner end, means for locking the gear-ring and blade together for conjoint rotation and in different positions resulting from relative movement of the gear-ring and the shank, comprising an axially extending substantially continuous annular series of teeth on the inner periphery of the gear ring, a locking ring having a flat face fitting against the flat transverse face on the shank and provided with an annular series of axially extending teeth on its outer periphery interfitting with the teeth on the gear-ring and axially extending means for fixedly securing the locking ring against the transverse face on the shank.

3. In a variable pitch propeller, the combination of a hub, a propeller blade having a shank mounted to rotate on its own axis and in the hub, a ring screw-threaded to the inner end portion of the shank provided on its outer periphery with an annular series of gear teeth, a gear carried by, and rotatable in, the hub and meshing with the ring for rotatably adjusting the blade in the hub, the shank having a bearing for its inner end in the hub, means for locking the gear-ring and blade together for conjoint rotation and in different positions resulting from relative movement of the gear-ring and the shank, comprising a locking ring, two axially extending annular series of interfitting teeth, one series of which is formed on the locking ring and the other of which is formed on one of the parts locked together for conjoint rotation, said locking ring being disposed outwardly of the bearing for the inner end of the shank, and means for fixedly securing the locking ring against axial movement with the two series of teeth in interfitting relation and for securing the ring against rotation relatively to the other of said parts.

4. In a variable pitch propeller, the combination of a hub, a propeller blade having a shank mounted to rotate on its own axis and in the hub, a ring screw-threaded to the inner end portion of the shank provided on its outer periphery with an annular series of gear teeth, a gear carried by, and rotatable in, the hub and meshing with the ring for rotatably adjusting the blade in the hub, the shank having a substantially flat transverse face adjacent its inner end, means for locking the gear-ring and blade together for conjoint rotation and in different positions resulting from relative movement of the gear-ring and the shank, comprising a locking ring intermediate the inner end of the shank and the gear-ring, two axially extending annular series of interfitting teeth separable by relative axial movement and relatively rotatable to secure the gear-ring in different positions on the shank, one series of teeth being formed on the locking ring the other series of teeth being formed on one of the parts locked together for conjoint rotation, and means for fixedly securing the locking-ring against axial movement with the two series of teeth in interfitting relation and for securing the ring against rotation relatively to the other of said parts.

5. In a variable pitch propeller, the combination of a hub, a propeller-blade having a shank mounted to rotate on its own axis and in the hub, a ring screw-threaded to the inner end portion of the shank provided on its outer periphery with an annular series of gear teeth, a gear carried by, and rotatable in, the hub and meshing with the ring for rotatably adjusting the blade in the hub, the shank having a substantially flat transverse face adjacent its inner end, means for locking the gear-ring and blade together for conjoint rotation and in different positions resulting from relative movement of the gear ring and the shank, comprising a locking ring intermediate the inner end of the shank and the gear-ring, two axially extending annular series of interfitting teeth separable by relative axial movement and relatively rotatable to secure the gear-ring in different positions on the shank, one series of teeth being formed on the locking-ring, the other series of teeth being formed on one of the parts locked together for conjoint rotation, means for securing the ring against rotation relatively to the other of said parts and axially extending means for fixedly securing the locking-ring against axial movement with the two series of teeth in interfitting relation.

6. In a variable pitch propeller, the combination of a hub, a propeller blade having a shank mounted to rotate on its own axis and in the hub, a ring screw-threaded to the inner end portion of the shank provided on its outer periphery with an annular series of gear-teeth, a gear carried by, and rotatable in, the hub and meshing with the ring for rotatably adjusting the blade in the hub, the shank having a substantially flat transverse face adjacent its inner end, means for locking the gear-ring and blade together for conjoint rotation and in different positions resulting from relative movement of the gear-ring and the shank, comprising a locking-ring intermediate the inner end of the shank and the gear-ring, two axially extending annular series of interfitting teeth separable by relative axial movement and relatively rotatable to secure the gear-ring in different positions on the shank, one series of teeth being formed on the locking-ring, the other series of teeth being formed on one of the parts locked together for conjoint rotation, means for securing the ring against rotation relatively to the other of said parts and axially extending elements extending through the locking-ring for securing the ring against axial movement.

7. In a variable pitch propeller, the combination of a hub, a propeller blade having a shank mounted to rotate on its own axis and in the hub, a ring screw-threaded to the inner end portion of the shank provided on its outer periphery with an annular series of gear-teeth, a gear carried by, and rotatable in, the hub and meshing with the ring for rotatably adjusting the blade in the hub, the shank having a substantially flat transverse face adjacent its inner end, means for locking the gear-ring and blade together for conjoint rotation and in different positions resulting from relative movement of the gear-ring and the shank, comprising an axially extending substantially continuous annular series of teeth on the inner periphery of the gear ring, a locking-ring having a flat face fitting against the transverse face on the shank of the blade provided with an annular series of axially extending teeth on its outer periphery interfitting with the teeth on the gear-ring, and axially extending devices for securing the locking-ring to the shank and extending through the locking-ring and into the shank.

PAUL F. HACKETHAL.